United States Patent

Dijkmans

[11] 4,110,636
[45] Aug. 29, 1978

[54] FEEDING BRIDGE

[75] Inventor: Eise Carel Dijkmans, Eindhoven, Netherlands

[73] Assignee: U.S. Philips Corporation, New York, N.Y.

[21] Appl. No.: 770,809

[22] Filed: Feb. 22, 1977

[30] Foreign Application Priority Data

Mar. 5, 1976 [NL] Netherlands .......................... 7602292

[51] Int. Cl.$^2$ .............................................. H03K 1/02
[52] U.S. Cl. ..................................... 307/237; 179/70; 307/255; 307/296 R
[58] Field of Search ....................... 307/237, 255, 296; 179/70, 16 AA, 18 FA, 170 NC

[56] References Cited

U.S. PATENT DOCUMENTS

| 3,955,052 | 5/1976 | Orbach | 179/18 FA |
| 4,007,335 | 2/1977 | Hetherington et al. | 179/18 FA |

*Primary Examiner*—John Zazworsky
*Attorney, Agent, or Firm*—Frank R. Trifari; Bernard Franzblau

[57] ABSTRACT

A bridge circuit provided with an isolation transformer having four primary windings which are connected such that the voice currents do and the supply currents do not generate a resulting flux in the core of the transformer and which comprises two transistor circuits. These circuits on the one hand prevent the flow of voice currents via a supply source connected to the bridge and on the other hand balance the bridge circuit so that the influence of longitudinal noise signals which are produced in a transmission line connected to the bridge circuit are suppressed.

6 Claims, 2 Drawing Figures

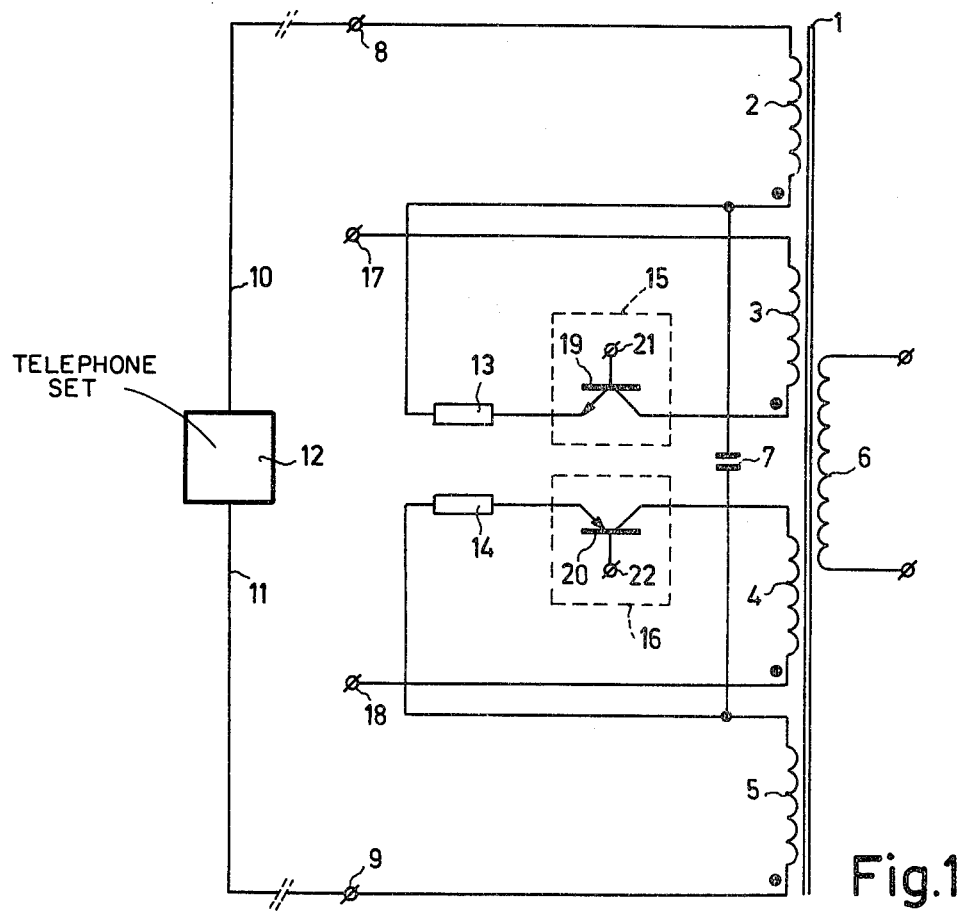
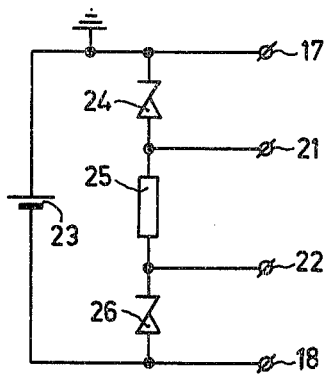

FEEDING BRIDGE

The invention relates to a feeding bridge comprising a pair of terminals for connection to a transmission line, an isolation transformer having four primary windings with equal numbers of turns and a secondary winding, and an isolation capacitor. One end of the capacitor is connected to the beginning of the first winding and is coupled to the beginning of the second winding. The other end of the capacitor is connected to the end of the fourth winding and is coupled to the end of the third winding. The end of the first winding and the beginning of the fourth winding are connected to the terminals and the end of the second winding is coupled to a first terminal of a voltage source and the beginning of the third winding is coupled to a second terminal of the voltage source. One end of the capacitor is coupled to the first terminal of a voltage source via a first transistor circuit.

Such a feeding bridge is known from German Patent Application No. 2,428,148 which has been laid open to public inspection and may be used in telecommunication exchanges having a central battery supply such as in telephone exchanges.

It is inter alia an object of this bridge circuit to protect the exchanges from foreign influences from local exchange networks. This is realized by means of a transformer. The voice currents which flow in the transmission line pass through the first and the fourth winding of the transformer via the capacitor connected between these windings which causes these currents to be transformed to the secondary winding. The feed current passes through all four windings which are connected two by two in the reverse direction so that the polarizing influence of the feed current in the windings one and four on the core of the transformer is compensated for by the influence of the feed current flowing in the reverse direction in the windings two and three. The first transistor circuit has for its object to prevent the voice currents from flowing through the voltage source via the windings two and three and the isolation capacitor.

In addition, the electric isolation obtained by means of the transformer offers the possibility that marking voltages and hold currents of the telephone channel network can be selected independently of the supply voltage and the current on the subscriber's line.

However, this bridge circuit has the drawback that the exchange is not protected from unwanted common mode signals produced on the transmission line.

It is an object of the invention to extend in a simple manner the protective action of said bridge circuit in such a way that the influence of the unwanted common mode signals produced on the transmission line is suppressed in the feeding bridge so that the secondary winding is prevented from supplying these common mode signals to the exchange.

The bridge circuit according to the invention is characterized in that the first transistor circuit comprises a main current path which has a high impedance at one end and a low impedance at the other end and that the transistor circuit is provided with a control terminal. The end with the high impedance is connected to the beginning of the second winding, the end with the low impedance is connected via a first supply resistor to the beginning of the first winding and the control terminal is connected to a third terminal of the voltage source. The feeding bridge comprises a second transistor circuit which is complementary to the first transistor circuit. The high impedance end of the second transistor circuit is connected to the end of the third winding, the end with the low impedance is connected via the second supply resistor to the end of the fourth winding and the control terminal is connected to a fourth terminal of the voltage supply source.

The invention is based on the recognition that suppressing the influence of the common mode signal can be achieved by balancing the feeding bridge mentioned in the opening of the description.

An embodiment of the invention will now be described, by way of example, with reference to the accompanying drawing in which:

FIG. 1 shows an embodiment of a feeding bridge according to the invention and

FIG. 2 shows a circuit of a voltage source for the feeding bridge according to the invention shown in FIG. 1.

The feeding bridge shown in FIG. 1 comprises an isolation transformer 1 which comprises four primary windings 2 to 5 inclusive with mutually equal numbers of turns and at least one secondary winding 6. An isolation capacitor 7 is connected between the beginning of the first winding 2 and the end of the fourth winding 5. The bridge further comprises two terminals 8 and 9 which are respectively connected to the end of the first winding 2 and the beginning of the fourth winding 5. A subscriber's telephone set 12 is connected to the terminals 8 and 9 via the cables 10 and 11 of a subscriber's line. A voice current supplied by the subscriber's set flows from the subscriber's set 12 through cable 10, terminal 8, the first winding 2, capacitor 7, the fourth winding 5, terminal 9 and cable 11 to the subscriber's set 12. The fluxes generated in the windings 2 and 5 by the voice currents have the same direction and induce, in a secondary winding 6, a voltage which is proportional to these voice currents so that the voice signals generated by the subscriber's set 12 are transferred via this feeding bridge to an exchange connected to the secondary winding 6.

In addition this feeding bridge comprises first and second transistor circuits 15 and 16 which are respectively connected to the beginning of the second winding 3 and the end of the third winding 4 and which are connected via respective supply resistors 13 and 14 to the beginning of the first winding and the end of the fourth winding. Furthermore, the end of the second winding 3 and the beginning of the third winding 4 are respectively connected to a first terminal 17 and a second terminal 18. The supply current is supplied by a voltage source which is connected between these terminals 17 and 18 and which is shown in FIG. 2. The supply direct current flows from terminal 17 via the second winding 3, the first transistor circuit 15, the first supply resistor 13, the first winding 2, the terminal 8, cable 10, subscriber's set 12 with closed switch-hook, cable 11, terminal 9, the fourth winding 5, the second supply resistor 14, the second transistor circuit 16, and the third winding 4 to terminal 18. The supply current flows through the windings 2 to 5 inclusive in such a way that the fluxes generated in the windings 3 and 4 are opposite to those generated in the windings 2 and 5 and, due to the equal number of turns, the fluxes generated by the supply current in the windings 2 and 5 are compensated by those in the windings 3 and 4. To that end the isolation transformer 1 has a comparatively small core.

In this embodiment the transistor circuits 15 and 16 comprise respective single transistors 19 and 20 which are complementary to one another. The collectors of these transistors, which have a high impedance, are respectively connected to the beginning of the second winding 3 and the end of the third winding 4. These high impedances ensure that the voltages caused by the voice currents flowing through the windings 2 and 5 do not cause a current to flow via the voltage source. As a result, the speech signals in this feeding bridge are not additionally attenuated.

The emitters of the transistors 19 and 20, which emitters have a low impedance, are respectively connected via the supply resistors 13 and 14 to the beginning of the first winding 2 and the end of the fourth winding 5. The bases are connected to respective third terminals 21 and 22 of the voltage source shown in FIG. 2. Any common mode signals occurring on the subscriber's line, that is to say common mode signals which have an equally large amplitude on the cables 10 and 11 and which are in phase with one another, are suppressed as follows. The current of a common mode signal which flows in the cable 10 will flow off via the terminal 8, the first winding 2, the first supply resistor 13, the first transistor circuit 15, the second winding 3 and the terminal 17 to a point of common potential (ground). The current of the common mode signal which flows in the cable 11 will flow off via the terminal 9, the fourth winding 5, the second supply resistor 14, the second transistor circuit 16, the third winding 4 and the terminal 18 and via the (low impedance) voltage source 23 (FIG. 2) to the point of common potential. Owing to the fact that the bridge is fully symmetrical and that these currents are in phase with one another, the currents cannot flow via the isolation capacitor 7 so that the fluxes generated by these currents in the windings 2 to 5 inclusive compensate one another two by two and cannot induce a resulting voltage in the secondary winding 6.

The low-ohmic impedance of the emitters of transistors 19 and 20 have the advantage that voltages which are produced as a result of a common mode signal are limited in the feeding bridge.

It should be noted that the transistor circuits 15 and 16 are not limited to the details shown in the embodiment of FIG. 1 but that they may, for example, comprise a Darlington circuit or a MOS FET etc.

FIG. 2 shows an example of a supply source suitable for this feeding bridge. It comprises a voltage source 23 having, connected in parallel therewith, a series circuit composed of a first zener diode 24, a resistor 25 and a second zener diode 26. The terminal 17 is connected to the positive terminal of the voltage source 23, the terminal 21 is connected between the zener diode 24 and the resistor 25, the terminal 22 is connected between the resistor 25 and the zener diode 26 and the terminal 18 is connected to the negative terminal of the voltage source 23.

This power supply causes a current flow from terminal 21 via the base-emitter junction of transistor 19, resistor 13, winding 2, terminal 8, the subscriber's telephone set 12, terminal 9, winding 5, resistor 14, the emitter-base junction of transistor 20 to terminal 22. The current holds both transistors 19, 20 in the normally conductive state. The voltage across the Zener diodes 24 and 26 are supplied between the base and the collector of transistor 19 and between the base and the collector of the transistor 20, respectively. These measures cause the high impedances of the collectors of the transistors 19 and 20, as was indicated before.

It should be noted that the supply of the transistors 19 and 20 can also be obtained by high ohmic potentiometers each connected between the collector and the emitter of the respective transistors whereby the bases of these transistors are connected to the taps of the potentio-meters.

I claim:

1. A bridge circuit comprising, a pair of terminals for connection to a transmission line, an isolation transformer having four primary windings with equal numbers of turns and a secondary winding, an isolation capacitor, means connecting one end of the capacitor to the beginning of the first winding and via a first transistor circuit to the beginning of the second winding, means connecting the other end of the capacitor to the end of the fourth winding and to the end of the third winding via a second transistor circuit complementary to the first transistor circuit, means connecting the end of the first winding and the beginning of the fourth winding respectively to the pair of terminals, means coupling the end of the second winding to a first terminal of a voltage source and the beginning of the third winding to a second terminal of the voltage source, the transistor circuits each comprising a main current path which has a high impedance at one end and a low impedance at the other end and a control terminal, means connecting the high-impedance end of the first transistor to the beginning of the second winding and the low-impedance end via a first supply resistor to the beginning of the first winding and the control terminal to a third terminal of the voltage source, and means connecting the high-impedance end of the second transistor circuit to the end of the third winding and the low-impedance end via a second supply resistor to the end of the fourth winding and the control terminal to a fourth terminal of the voltage source.

2. A bridge circuit according to claim 1 further comprising a series circuit including a first Zener diode, a resistor and a second Zener diode coupled to the bridge circuit whereby the first Zener diode is connected between the end of the second winding and the base of the first transistor, the resistor is connected between the base of the first transistor and the base of the second transistor and the second Zener diode is connected between the base of the second transistor and the beginning of the third winding.

3. A bridge circuit as claimed in claim 1 wherein the voltage source comprises a first Zener diode, a resistor and a second Zener diode connected in series circuit across a DC voltage source with the first Zener diode connected between the first and third terminals of the voltage source, the resistor connected between the third and fourth terminals of the voltage source and the second Zener diode connected between the fourth and second terminals of the voltage source.

4. A transformer system for coupling a pair of input terminals to a pair of output terminals comprising, an isolation transformer having four primary windings each having the same number of turns and a secondary winding coupled to the output terminals, a capacitor, first and second complementary transistors, first and second impedance elements, means serially connecting a first primary winding, the capacitor and a fourth primary winding across the input terminals with the first and fourth windings polarized in the same direction, a pair of supply terminals for connection to a source of supply voltage, means serially connecting a second primary winding, the first transistor, the first impedance element, and the first primary winding between a first supply terminal and a first one of said input terminals, means serially connecting a third primary winding, the second transistor, the second impedance element and the fourth primary winding between a second supply terminal and a second one of said input terminals, and means for forward biasing the control electrodes of said first and second transistors, said first and second windings and said third and fourth windings being oppositely polarized for the flow of supply current from the supply terminals so that the flux produced by the second and third windings opposes the flux produced by the first and fourth windings.

5. A transformer system as claimed in claim 4 wherein said four primary windings are wound on a magnetic core with the same polarity.

6. A transformer system as claimed in claim 5 wherein the collector electrodes of said first and second transistors are connected respectively to oppositely polarized terminals of said second and third primary windings.

* * * * *